INVENTORS
LOTHAR HAASE
RUDOLF POCHERT
BY
ATTORNEY.

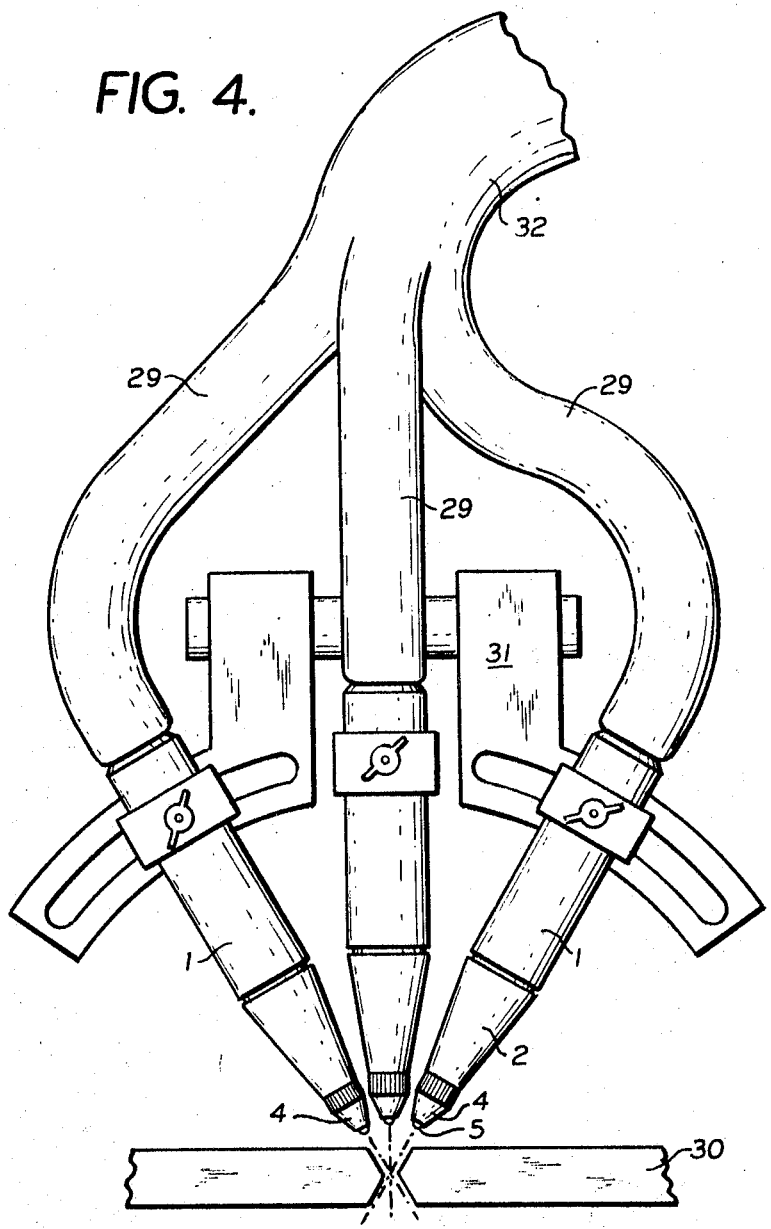

United States Patent Office 3,459,376
Patented Aug. 5, 1969

3,459,376
PLASMA BURNER
Lothar Haase and Rudolf Pochert, Dresden, Germany, assignors to Kjellberg Elektroden & Maschinen GmbH in Verwaltung, Finsterwald, Germany, a corporation of Germany
Filed June 12, 1967, Ser. No. 645,334
Int. Cl. B05b 15/00; B23k 9/16, 9/24
U.S. Cl. 239—132.3                                    2 Claims

ABSTRACT OF THE DISCLOSURE

A plasma burner comprising a conical burner head and a nozzle cap operatively connected with the burner head, a plasma burner having measurements being a part and a multiple, respectively, of its outer diameter, such that the burner head is reduced over its longitudinal length, amounting to about 2.2 up to about 2.8 times of its outer diameter, to a diameter amounting to about 0.1 up to about 0.3 times of its outer diameter. The cone of the nozzle-cap is reduced from a diameter, amounting to about 0.3 up to 0.7 times of the outer diameter, over a length, amounting to about 0.3 up to about 0.5 times of the outer diameter, to a predetermined diameter, and the total length of the nozzle cap amounts to about 0.5 up to about 0.8 times of the outer diameter. The length of the cone above the nozzle cap results from the difference of the longitudinal length of the burner head and the total length of the nozzle cap, and the length amounts to about 1.3 up to 1.7 times of the outer diameter.

---

The present invention relates to a plasma burner, preferably for the plasma-smelt-cutting of work material and for the preparation of the welding edges.

Plasma burners of different structures are known. They have, however, the common drawback that their measurements, in particular within the range of the nozzle and the nozzle cap, are so unfavorable that they do not overrun the required setting range of the phase angle, since the plasma burners cannot be sufficiently inclined toward the work piece, without increasing the distance between the nozzle and the work piece to an extent, that the plasma flame is extinguished or does not ignite and is too short, respectively, in order to work still the work piece. The same drawbacks also do not permit the combination of a plurality of burners to a multiple burner unit, which combination is known in the autogenous welding technique.

In the case of work piece-poled plasma burners, the permissible distance between the nozzle exit and the work piece reduces itself for a further step, since it is limited by the length of pilot light arc, which starts by engagement with the work piece the main (cutting) arc.

The most essential drawback of the known plasma burners resides, however, in the fact, that it is not possible, as it is known in the autogenous welding technique, to arrange a plurality of burners, such that the angle and the distance between two burners are small enough, in order to bring about small phase angles at a small radius of the form-piece to be cut out, without non-permissible contour distortion.

A selective reduction of the outer diameter of the plasma burner is, however, not easily possible in view of the insulation and cooling problems. This relates also particularly to the range of the burner head. It is here of essence to cool sufficiently the cathode and the cathode holder, as well as the nozzle, and to insulate the same electrically from each other.

It has been proposed already before, therefore, to extend the cathode holder up to the gas discharge chamber and to cool by a direct passage of a cooling medium.

It has been proposed further, to lead the control members for the working gases and the cooling feed and removal axially within the shaft of the plasma burner.

It is one object of the present invention, to provide a plasma burner which avoids the drawbacks of the known structures.

It is another object of the present invention, to provide a plasma burner, which in addition to the normal cutting tasks fulfills also the requirements for the application as a form burner in multiple burner units for the preparation of the welding edges.

It is still another object of the present invention, to provide a plasma burner, wherein the cooling and the electrical insulation, as well as the proportions, particularly within the range of the burner head, are designed such, that upon axial lead of all feeding conduits within the shaft of the plasma burner a particularly small diameter, a particularly small burner head and a particularly acute angle nozzle and nozzle cap are obtained.

It is yet another object of the present invention to provide a plasma burner, wherein the outside measurements of the plasma burner are determined as part or as a multiple of its largest diameter, such that the burner head is reduced over a length K, which amounts to 2.2 up to 2.8 times preferably 2.5 times, of the outer diameter D, to a diameter $e$, which amounts to 0.1 up to 0.3 times, preferably 0.2 times of the outer diameter D, and wherein the cone of the nozzle cap is reduced from a diameter $b$, which is 0.3 up to 0.7 times, preferably 0.5 times of the outer diameter D, over a length $d$, which amounts to 0.3 up to 0.5 times, preferably 0.4 times, of the outer diameter D, to the diameter $e$, and wherein the total length $c$ of the nozzle cap amounts to 0.5 up to 0.8 times, preferably 0.7 times, of the outer diameter D and wherein the length $a$ of the cone above the nozzle cap results from the difference of the length K and $c$, whereby the length $a$ amounts to 1.3 up to 1.7 times, preferably 1.5 times, of the outer diameter D.

It is suitable that the nozzle projects at least for 7% of its length from the nozzle cap and that the nozzle cap is equipped with a mechanically sealing collar.

Furthermore, it is suitable to arrange between the nozzle and the nozzle cap a uniform cooling fluid slot.

It is also advantageous that the feeding and removal of the cooling fluid in the nozzle cap takes place over two slots and the nozzle holder, which are set off by 180°.

It is still another object of the present invention to provide a plasma burner, wherein the insulator disposed about the cathode holder is equipped with an inner thread.

It is particularly advantageous, that the bores arranged in the insulator for the cooling fluid feeding and removal are equipped with a thread.

Furthermore, it is suitable, that upon combination of a plurality of individual burners to a multiple unit, up to direct to the individual burners, the cooling fluid, the working gases and the control conduits are formed as common feeders.

The technically economical effects particularly the technical progress of the present invention reside in the fact that a plasma cutting burner of particularly slim design and with an extreme acute nozzle and nozzle cap is produced, which is particularly suitable as an individual burner, as well as upon combination of a plurality of individual burners to a multiple unit excellently for cutting, cutting in and preparation of welding edges (phase cuts).

With these and other objects in view which will become apparent in the following detailed description, the present invention will be clearly understood in connection with the accompanying drawings, in which:

FIG. 4 is an elevation of a plurality of plasma burners disclosed in FIG. 1 combined to a multiple unit.

Figure 1:
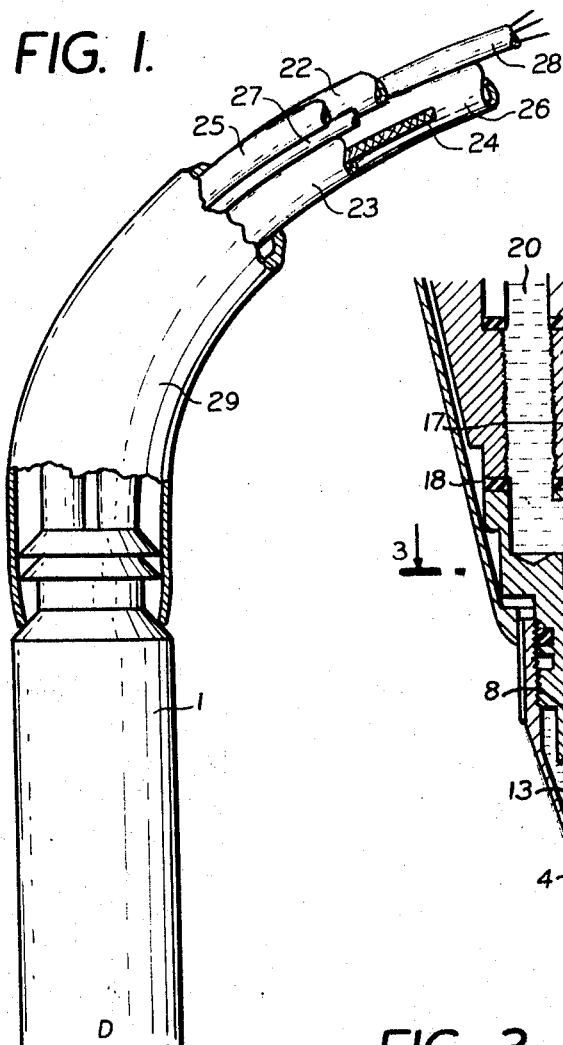
FIGURE 1 is a total elevation of the plasma burner designed in accordance with the present invention, partly in section, indicating its outer contours.
Figure 2:
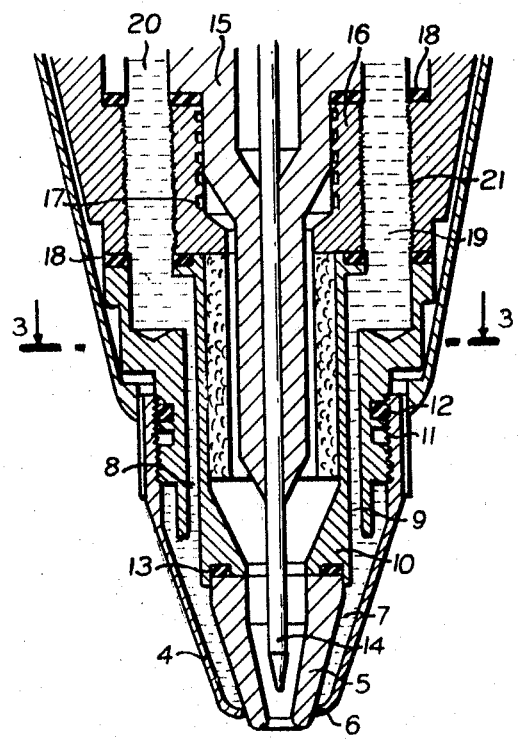
FIG. 2 is an enlarged axial section of the burner head.
Figure 3:
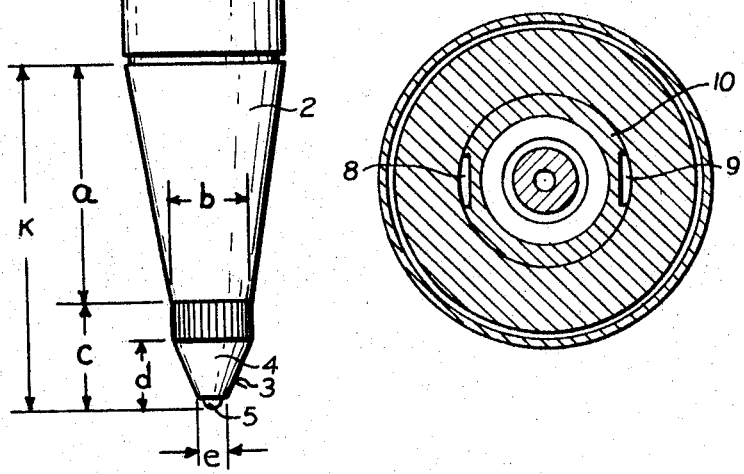
FIG. 3 is a section along the lines 3—3 of FIG. 2.

Referring now to the drawings, and in particular to FIGS. 1 and 3, the special structure and the measurements of the plasma burner, designed in accordance with the present invention, are brought about by providing proper proportions and structural features of the burner head. All construction elements are in proportional relationship with the outer diameter D of the shaft 1 of the plasma burner, or the largest diameter of the substantially frustoconically shaped burner head, that means all measurements are obtained as a partial amount or a multiple of the outer diameter D. The burner head 2 is reduced over a length K, which amounts to about 2.2 up to 2.8 times, preferably 2.5 times of the outer diameter D to a diameter $e$, which amounts to 0.1 up to 0.3 times, preferably 0.2 times, of the outer diameter D.

The cone 3 of the nozzle cap 4 is reduced from a maximum diameter $b$, which amounts to 0.2 to 0.7 times, preferably 0.5 times, of the outer diameter D, over a length $d$, which amounts to 0.3 up to 0.5 times, preferably to 0.4 times of the outer diameter D, to the diameter $e$. The total length $c$ of the nozzle cap 4 amounts to 0.5 up to 0.8 times, preferably 0.7 times, of the outer diameter D.

The length $a$ of the burner head 2 above the nozzle cap 4 results from the difference of the length K and the length C, respectively, which amounts to 1.3 up 1.7 times, preferably 1.5 times of the outer diameter D.

If the outer diameter D is 50 mm., the proportions and measurements (compare also FIG. 1) appear as follows in the following table:

| | D=50 mm. | | |
|---|---|---|---|
| | From— | To— | Preferably |
| K | 110 | 140 | 125 |
| b | 15 | 35 | 25 |
| e | 5 | 15 | 10 |
| d | 15 | 25 | 20 |
| c | 25 | 40 | 35 |
| a=K−c | 65 | 85 | 85 |
| L | 250 | 350 | 300 |

L is the total length of the plasma burner.

The slim shape of the burner head 2 is brought about by the use of a particular acute cutting nozzle 5, the inner and outer angles of which are equal relative to each other and also equal to the inner and outer angles of the nozzle cap 4. Between the nozzle cap 4 and the cutting nozzle 5 is formed the cooling fluid chamber, by equipping the nozzle cap 4 with a collar 6, which is metallically sealed with the cutting nozzle 5, so that a uniform annular silt 7 is created as a cooling fluid chamber.

The feeding and removing of the cooling medium, generally water, takes place by two slots 8; disposed set off relative to each other, for 180° in the nozzle holder 10, which make possible a small outer diameter of the nozzle cap 4.

The nozzle cap 4 is screwed on by means of a thread 11 and sealed off with a circular rubber member 12. By means of its collar 6, it simultaneously presses the cutting nozzle 5 towards an annular rubber member 13. The application of an acute cutting nozzle 5 is rendered possible by the insertion of rod cathode 14 of small diameter, which centers into a cathode holder 15 of copper advanced to the immediate vicinity of the cutting nozzle 5 and is retained by means of clamping tongues (not shown) releasable from the outside. By the much advanced cathode holder 15, on the one hand, a very good heat removal is obtained from the rod cathode 14, on the other hand, a good centering of the rod cathode 14 to the cutting nozzle 5 is automatically assured. An insulator 16 disposed between the cathode holder 15 and the nozzle holder 10 is equipped with inner threads 17, which assures a tangential gas guidance. The gas flow about the cathode holder 15 obtained thereby results in an additional cooling thereof, furthermore a cooling gas jacket is brought about simultaneously equally distributed over the periphery of the cutting nozzle wall, which gas jacket prevents a double arc formation. This insulator 16 disposed between the cathode holder 15 and the nozzle holder 10 is equipped on both sides with a flat form sealing 18 of rubber. The slots 8 and 9 set off 180° disposed in the nozzle holder 10 for the feeding and removal of the cooling medium continue straight as bores 19; 20 in the insulator 16 and in the cathode holder 15 and terminate on hose connection provided there. By this arrangement, particularly cool channels are omitted in the cathode holder 15. The bores 19 and 20 are equipped with a thread 21 in the insulator 16, so that thereby the insulating surface is multiplied.

Directly on the cathode holder 15 are disposed the mixing nozzle and thereto the magnet valves (not shown) for the gas control in the shaft 1.

The water connections and the pilot stream connection are likewise provided in the shaft 1.

All connecting conduits, the water feed 22, the water return 23 with the current feed 24, the working gas feeding 25, the additional gas feed 26, the pilot current feeding 27 and magnet valve control conduits 28 leave the plasma burner as a flexible closed package. They are surrounded by a sleeve hose 29.

The plasma burner designed in accordance with the present invention excels itself thus by a completely closed structure which is of great advantage in a practical application. The housing is cylindric up to tapered down portion. The tapered down portion forms a total angle of less than 16°. The nozzle cap 4 has a total angle of less than 40°.

The plasma burner can produce light arc outputs up to 30 kw. in case of cutting nozzle diameters of less than 2 mm., whereby a cooling medium requirement of only about 5 l./min. and with a maximum pressure of 3 kg./cm.$^2$ is necessary. Work pieces 30 can be cut and worked up to a thickness of 50 mm. at a cutting width of less than 3.5 mm.

The described plasma burner is in a position to cut in without difficulty as an individual burner, since due to the extreme acute, and in the diameter very small, burner head, the molten material can be removed upwardly without any resistance. Furthermore, an excellent sight possibility in case of measure cuts and in cuts following slits, respectively, presents itself. In case of oblique cuts an extreme angular position is possible, which complies with all requirement in the practice. By the slim structure and the small diameter of the burner particularly in the cutting nozzle range, it is possible without difficulty, to cut plasma with a multiple burner unit 31 (FIG. 4), since the setting and holding of the plasma burners is possible following the autogenous welding technique (FIG. 4). The individual plasma burners are thereby set off at least for the diameter of the plasma stream in the direction of movement.

By the magnet valves built into the plasma burners, in case of multiple burner units 31 common gas feedings are possible for all plasma burners, which gas feedings divide themselves only directly on the unit 31. All magnet valves, which must be open during the ignition of the pilot arcs, can be connected in parallel, in order to save control conduits.

Due to the low cooling medium requirement, a joint cooling medium conduit for a plurality of plasma burners suffices.

The individual surrounding hoses are then transformed into a joint covering hose 32.

While we have disclosed two embodiments of the present invention, it is to be understood that these embodiments are given by example only and not in a limiting sense.

We claim:

1. A high output density plasma burner with direct water-cooled nozzle and nozzle cap, particularly for phase and profile cutting and for insertion on a torch cutting machine, comprising:

a housing comprising, a cylindrical shaft, a substantially frustoconical burner head operatively connected to the lower end of said shaft, a nozzle cap including a downwardly tapering frustoconical cone operatively connected at the lower portion of said burner head and constituting a part thereof, said frustoconical cone forming an acute angle with the vertical and forming an inwardly directed collar at the bottom thereof, and a cutting nozzle of frustoconical shape forming an acute angle with the vertical and disposed within, and circumferentially spaced from said nozzle cap and defining a uniform annular split between said cutting nozzle and said nozzle cap, said collar abutting said cutting nozzle in metal tight relationship preventing liquid leakage from said uniform annular split, and said nozzle cap projecting beyond the bottom of said nozzle cap at said collar, an insulator disposed in said burner head and having a central opening therein, a nozzle holder having an axial opening therethrough and coaxially disposed between the upper end of said cutting nozzle and the lower end of said insulator, said collar pressing said cutting nozzle upwardly against said nozzle holder, a cathode holder having an inner thread and disposed within said central opening of said insulator and extending into said axial opening of said nozzle holder, a rod cathode axially held by said cathode holder and passing therethrough into said cutting nozzle, said nozzle holder formed with passage means for feeding and removing a cooling medium into and from said annular split defining in cross section two slots set off relative to each other by about 180° and communicating with said annular split, said insulator having two threaded longitudinally extending bores in liquid communication with said two slots, respectively, for feeding and removing said cooling medium, means for passing an operating gas between said insulator and said cathode holder along said inner thread of said insulator to said rod cathode, and said burner head is tapered over a length of at least 2.2 times the diameter of said shaft and to a diameter of about at least 0.3 times the diameter of said shaft at the top of said nozzle cap.

2. A plurality of plasma burners, as set forth in claim 1, constituting a multiple burner unit, and a joint conduit for all of said plurality of plasma burners containing a first conduit for said cooling medium, a second conduit for said operating gas and a magnet valve control conduit adapted to be operative during ignition of pilot light arcs, said first, second and magnet valve control conduits extending directly to each individual plasma burner.

References Cited

UNITED STATES PATENTS

| | | | |
|---|---|---|---|
| 1,107,429 | 8/1914 | Luening | 239—132.3 |
| 2,512,705 | 6/1950 | Anderson. | |
| 2,960,594 | 11/1960 | Thorpe. | |

M. HENSON WOOD, Jr., Primary Examiner

B. BELKIN, Assistant Examiner

U.S. Cl. X.R.

219—75; 239—79